United States Patent
Mishima et al.

(10) Patent No.: US 8,289,376 B2
(45) Date of Patent: Oct. 16, 2012

(54) IMAGE PROCESSING METHOD AND APPARATUS

(75) Inventors: Nao Mishima, Inagi (JP); Kenichi Shimoyama, Tokyo (JP); Takeshi Mita, Yokohama (JP); Takashi Ida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/415,381

(22) Filed: Mar. 8, 2012

(65) Prior Publication Data

US 2012/0169844 A1    Jul. 5, 2012

Related U.S. Application Data

(63) Continuation of application No. PCT/JP2009/065683, filed on Sep. 8, 2009.

(51) Int. Cl.
    *H04N 13/00*    (2006.01)
(52) U.S. Cl. .......................................................... 348/43
(58) Field of Classification Search ...................... 348/43
See application file for complete search history.

(56) References Cited

U.S. PATENT DOCUMENTS 5,259,040 A * 11/1993 Hanna ........................... 382/107

FOREIGN PATENT DOCUMENTS

| JP | 7-264631 | 10/1995 |
|---|---|---|
| JP | 2000-261828 A | 9/2000 |
| JP | 2007-502454 | 2/2007 |

OTHER PUBLICATIONS

International Search Report mailed Dec. 1, 2009 for PCT/JP2009/065683, filed Sep. 8, 2009 (with English Translation).
International Written Opinion, mailed Dec. 1, 2009, for PCT/JP09/065683, filed Sep. 8, 2009.

* cited by examiner

*Primary Examiner* — David Czekaj
*Assistant Examiner* — Tracy Li
(74) *Attorney, Agent, or Firm* — Oblon, Spivak, McClelland, Maier & Neustadt, L.L.P.

(57) ABSTRACT

An image processing method for creating a disparity image for 3D display from a 2D video image includes detecting based on a first image of the 2D video image in a time and a second image in a time different from the first image, motion vectors between the first and second images for each block of the first image, detecting from the motion vectors, a most backward vector of a portion whose depth is on the back side, calculating differential vectors between each motion vector and the most backward vector and giving a depth on a close to the block of the first image corresponding to the motion vector having the larger differential vector and creating one or more disparity images from the first image and the depth.

6 Claims, 7 Drawing Sheets

IMAGE PROCESSING METHOD AND APPARATUS

CROSS REFERENCE TO RELATED APPLICATIONS

This application is a Continuation application of PCT Application No. PCT/JP2009/065683, filed Sep. 8, 2009, the entire contents of which are incorporated herein by reference.

FIELD

Embodiments described herein relate generally to an image processing method and apparatus for creating a disparity image for a stereo display from a two-dimensional image.

BACKGROUND

A stereo display technique is known which makes a viewer recognize a stereo image by displaying images with a disparity to watch them with the left and right eyes, respectively. The image watched with the left eye is deviated a little from the image watched with the right eye in manner of triangulation. The viewer judges whether the object is frontward or backward by grasping the deviation in manner of triangulation. In other words, a three-dimensional image with a binocular disparity between images is necessary to realize a stereo display.

In recent years, a technique is developed which generates such an image to make it possible to display, in a three-dimension, a two-dimensional image including no three-dimensional information originally as a conventional television broadcast. When the three-dimensional image is created from the two-dimensional image, the disparity indicating how much the image watched with the left eye is deviated from the image watched with the right eye is very important. When an object is imaged with a single camera, the information of depth is lost. Therefore, it is a problem in converting the two-dimensional image to the three-dimensional image how the depth is obtained. For example, JP-A 7-264631 (KOKAI) provides a method for realizing a stereoscopic view by detecting a motion vector from a reference frame of a two-dimensional image to another frame, determining a frame delay amount based on a horizontal component of the motion vector, determining an amount of delay of a frame and a line based on a vertical component of the motion vector, creating a disparity image corresponding to the reference frame from the amount of delay of the frame and line, and converting this disparity image into a stereoscopic image based on a motion stereo principle. However, this method can create a correct disparity image by compensating up-and-down motion of the whole screen, but cannot create a correct disparity image because an object is wobbled when the object moves locally in the screen.

In addition, JP-A 2000-261828 (KOKAI) provides a method for detecting a motion vector and a background region, calculating a background vector from the motion vector of the background region, calculating a relative vector by reducing the background vector from all motion vectors, and creating such a disparity image that the object draws closer the viewer as the relative vector increases. However, this method may provide an unreasonable disparity image such that the object existing in the back is located on the front.

DETAILED DESCRIPTION

There will now be described embodiments of the present invention in detail.

An embodiment of the present invention provides an image processing method for creating a disparity image for a three-dimensional display from a two-dimensional video image, comprising: detecting, based on a first image of the two-dimensional video image in an arbitrary time and a second image in another time different from the first image, motion vectors between the first image and the second image for each block of the first image; detecting a most backward vector of a portion whose depth is on the back side from the motion vectors; calculating differential vectors between each motion vector and the most backward vector and giving a depth on a close to the block of the first image corresponding to the motion vector having the larger differential vector; and creating one or more disparity images from the first image and the depth.

A First Embodiment

An image processing apparatus for generating a disparity image for a stereoscopic display from a two-dimensional image according to the first embodiment is described with reference to FIG. 1.

Figure 1:
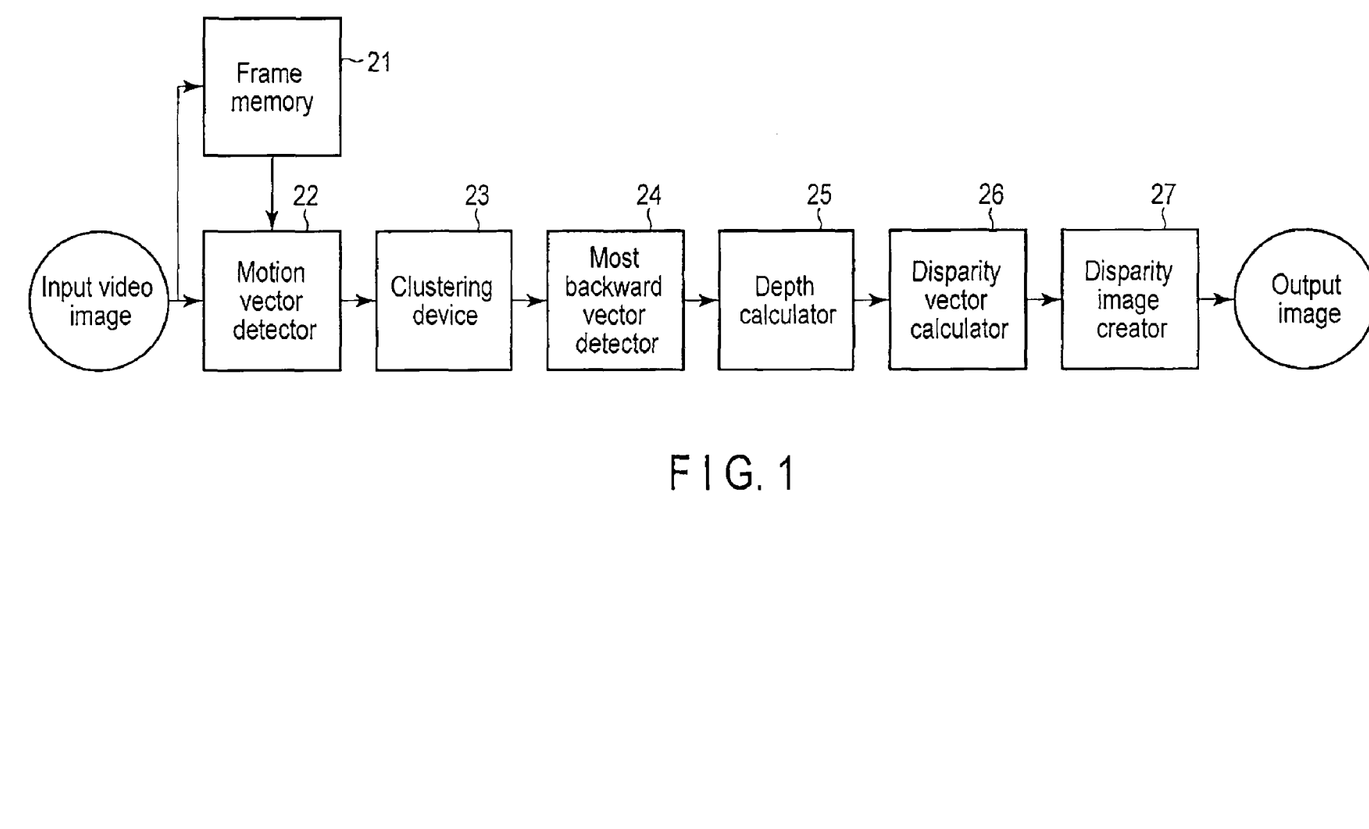
FIG. 1 is a block diagram of an image processing apparatus for generating a disparity image for a stereoscopic display from a two-dimensional image according to a first embodiment.

According to the video processor shown in FIG. 1, a frame memory 11 stores an input video from a video apparatus such as a video camera or a video player in units of a frame. This frame memory 11 is connected to a motion vector detector 21. The motion vector detector 21 detects a motion vector from the input video image and an image stored in the frame memory 11 by a well-known method such as block matching. The output of the motion vector detector 21 is connected to a clustering device 23. The clustering device 23 divides an image (a frame) into a plurality of regions (clusters). The output of the clustering device 23 is connected to a most backward vector detector 24 and detects a vector of the most backward object, i.e. the most backward vector based on the clusters. Concretely, superimposition of the back object and the front object is detected based on the clusters. The cluster superimposed most by other clusters is determined as being the most backward, and the vector of this cluster is detected as the most backward vector. The output of the most backward vector detector 24 is connected to a depth calculator 25 which calculates a depth from the most backward vector. Concretely, a distance from the most frontward object to the most backward object is calculated from the most backward vector and the vector of the most frontward object or the most frontward vector. The output of the depth calculator 25 is connected to a disparity vector calculator which calculates a disparity vector based on the depth information. The output of the disparity vector calculator 26 is connected to a disparity image creator 27. This disparity image creator 27 creates an image to be watched with the left eye and an image to be watched with the right eye from the disparity vector by a method described hereinafter.

Figure 2:
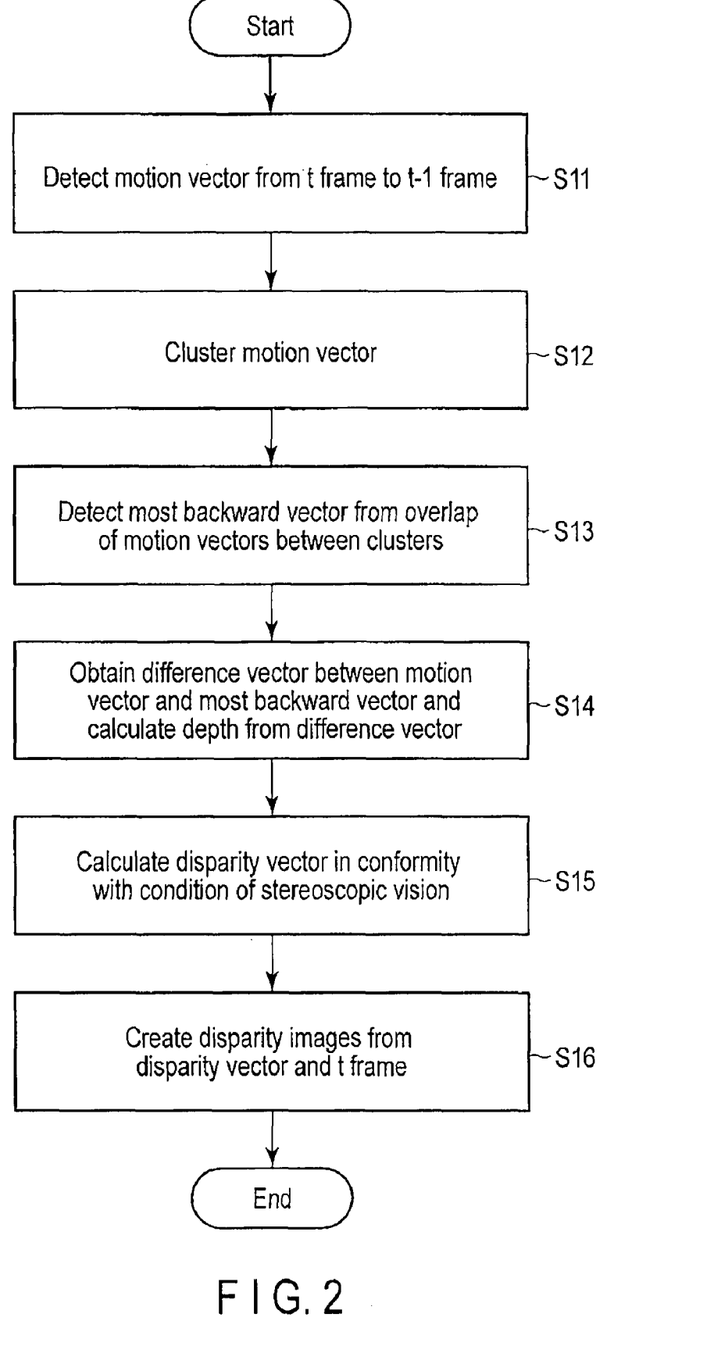
FIG. 2 is flowchart indicating an image processing method according to the first embodiment.
Figure 3:
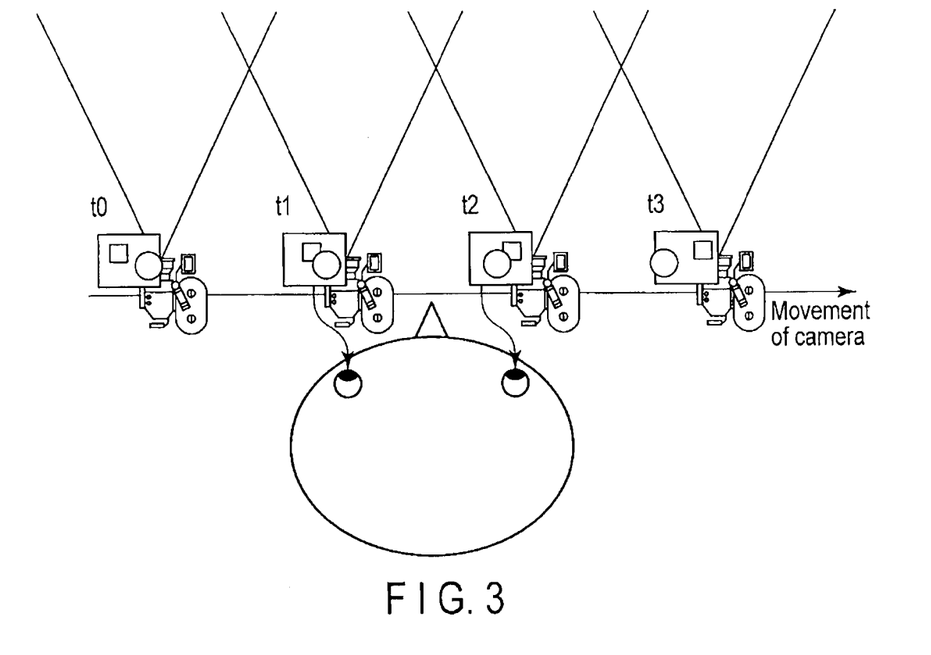
FIG. 3 is a diagram for illustrating principle of a motion stereo.

A mechanism for converting a two-dimensional image into a three-dimensional image is described with reference to flowchart of FIG. 2 before describing the action of the image processing apparatus of FIG. 1. The grounds for creating the three-dimensional image from the two-dimensional image are to utilize a principle of a motion stereo as shown in FIG. 3.

Figure 4:
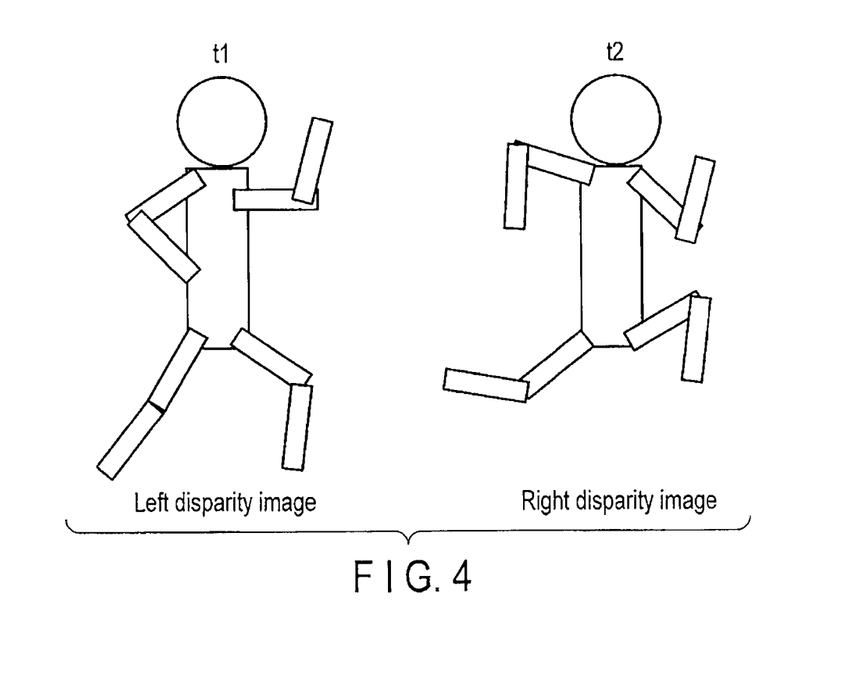
FIG. 4 is a diagram for illustrating a condition that a motion wobbles.

In other words, assuming that a camera images while it moves from the left to the right, it is considered that the image in a time t1 resembles an image watched with the left eye closely and an image in a time t2 resembles an image watched with the right eye closely. A stereoscopic vision can be realized by watching such the images of the moving camera with the right eye and the left eye. As thus described a technique to use the video images from the moving camera as a left disparity image and a right disparity image respectively is a motion stereo. However, as shown in FIG. 4, if there is an object moving independently from movement of the camera in a screen, the images different in time come to enter the right eye and the left eye, resulting in that the object cannot be correctly viewed stereoscopically due to wobble of a hand or a foot.

Thus, in the present embodiment, a motion vector from a reference frame of an input video image to a frame in a different time is obtained as a disparity vector, a depth map is calculated from the disparity vector, a disparity vector is calculated again from the calculated depth map, and two disparity images are created from the reference frame (not limited to two disparity images). As described above, since the disparity images in the same time of day can be generated from a single reference frame (in a time of day), the aforementioned problem associated with the wobble of the hand or foot is solved.

Figure 5:
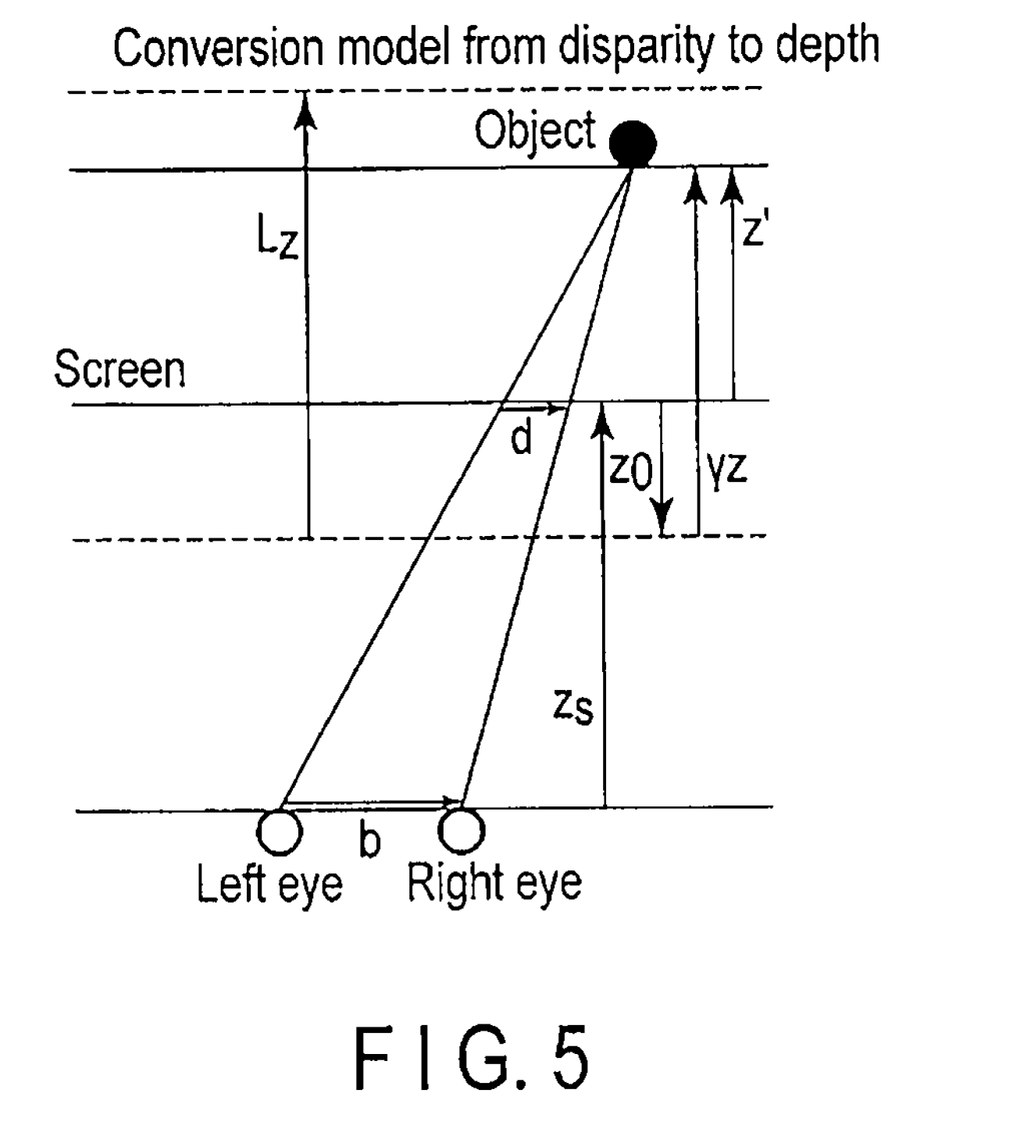
FIG. 5 is a diagram for illustrating a conversion model from a disparity vector to the back.

When the horizontal component of the motion vector is assumed to be a disparity vector, it is known that conversion from the disparity vector to the depth accords to the model of FIG. 5 from a geometric relation between the right and left eyes of a human being and a to-be-viewed object. Since the right and left eyes are arranged horizontally, the disparity occurs basically in a horizontal direction of left and right. According to this model, a natural depth can be re-created from movement. However, because only a horizontal component of the movement can be used, the object is limited to an image having a movement in a horizontal direction.

The present embodiment employs a method of pursuing the depth from the movement of a moving image without detecting a background vector. In other words, the motion vector (the most backward vector) of a region to be arranged on the most backward side is detected, and the larger the difference vector with respect to the most backward vector is, the more frontward the object is arranged. The most backward vector is detected from a superimposition relation between motion vectors. As thus described the objects can be arranged on the frontward side in turn from a most backward region according to the difference between motion vectors.

There will now be described an action of a video processing apparatus of FIG. 1 with reference to flowchart of FIG. 2.

Assuming that in an input two-dimensional video image, the pixel value at the position x,y of the frame in the time t is It(x,y), the pixel value at the position x,y of the frame in the time t−1 is It−1(x,y), and the pixel value at the position x,y of the frame in the time t+1 is It+1(x,y).

<A Motion Vector Detection Step S11>

In the motion vector detection step S11, the motion vector detector 22 detects a motion vector from the t-frame to the t−1-frame. Various methods are usable for detection of the motion vector, but the method using block matching, without being limited to, is described here. The block matching is a method of dividing the t-frame into rectangular blocks, and searching the t−1 frame for a corresponding block for each block. The sizes of the blocks are assumed to be M1 and M2 and the positions of the blocks are assumed to be i,j. A mean absolute value difference (MAD) can be used as an error function for obtaining a movement.

$$MAD(i, j, t, t-1, u_x, u_y) = \qquad (1)$$

$$\frac{1}{M_1 M_2} \sum_{0 \le x < M_1, 0 \le y < M_2} |I_t(M_1 i + x, M_2 j + y) - I_{t-1}(M_1 i + x + u_x, M_2 j + y + u_y)|$$

u=(ux,uy)T is a motion vector to be evaluated (T indicates a transpose). Alternately, a mean squared error may be used. Assuming that the search range is a rectangular region from −W to W, the block matching algorithm for obtaining a motion vector u(i,j) of i,j position is as follows.

$$u(i, j) = \operatorname*{argmin}_{-W \le u_x \le W, -W \le u_y \le W} MAD(i, j, t, t-1, u_x, u_y) \qquad (2)$$

$$\operatorname*{argmin}_{-W \le u_x \le W, -W \le u_y \le W} E$$

expresses to catch $u_x, u_y$ making the error function E smallest.

In addition, a motion vector in the block is assumed to be identical to a motion vector of the block.

$$u(x,y) := u(i,j) \qquad (3)$$

In addition, even if a motion vector is not detected here, a motion vector used for compression in video encoding such as MPEG2 may be used, or a motion vector decoded with a decoder can be used.

<Clustering Step S12>

In the clustering step S12, the clustering device 23 sorts the objects approximating to each other in the direction of the motion vector and the size thereof. The clustering method can use a K-means method without being limited to. The process using the K-means method will be described hereinafter.

In the K-means method, the blocks approximating in the direction of the motion vector and the size thereof are sorted in k regions called clusters. It is expressed by the following equation (4) which cluster belongs to the motion vector of the x,y position.

$$l(x,y) \in \{0, 1, \ldots, K-1\} \qquad (4)$$

In the case of I(x,y)=3, it is expressed that the motion vector of the x,y position belongs to the third cluster.

[K-Means Method Algorithm]

Step 1: An initial label $l^{(0)}(x,y)$ is given by a suitable manner such as random.

Step 2: A intra-cluster mean vector $\bar{u}_k^{(n)}$ of N-th iteration of all clusters is obtained.

Step 3: With each motion vector, a cluster that a difference (difference vector) between the intra-cluster mean vector and the motion vector is smallest is selected from all clusters, and the label is updated by the number of the cluster.

Step 4: Steps 2 and 3 are repeated to iteration defined beforehand.

By the above, the motion vectors can be divided into k clusters, and k intra-cluster mean vectors are calculated.

<The Most Backward Vector Detection Step S13>

In the most backward vector detection step S13, the most backward vector detector 24 selects the motion vector to be arranged on the most backward side from the detected intra-cluster mean vectors. The most backward region is a region on which another object is superimposed with the highest probability in superimposition of the objects. Such a region is determined by overlap of motion vectors.

Figure 6:
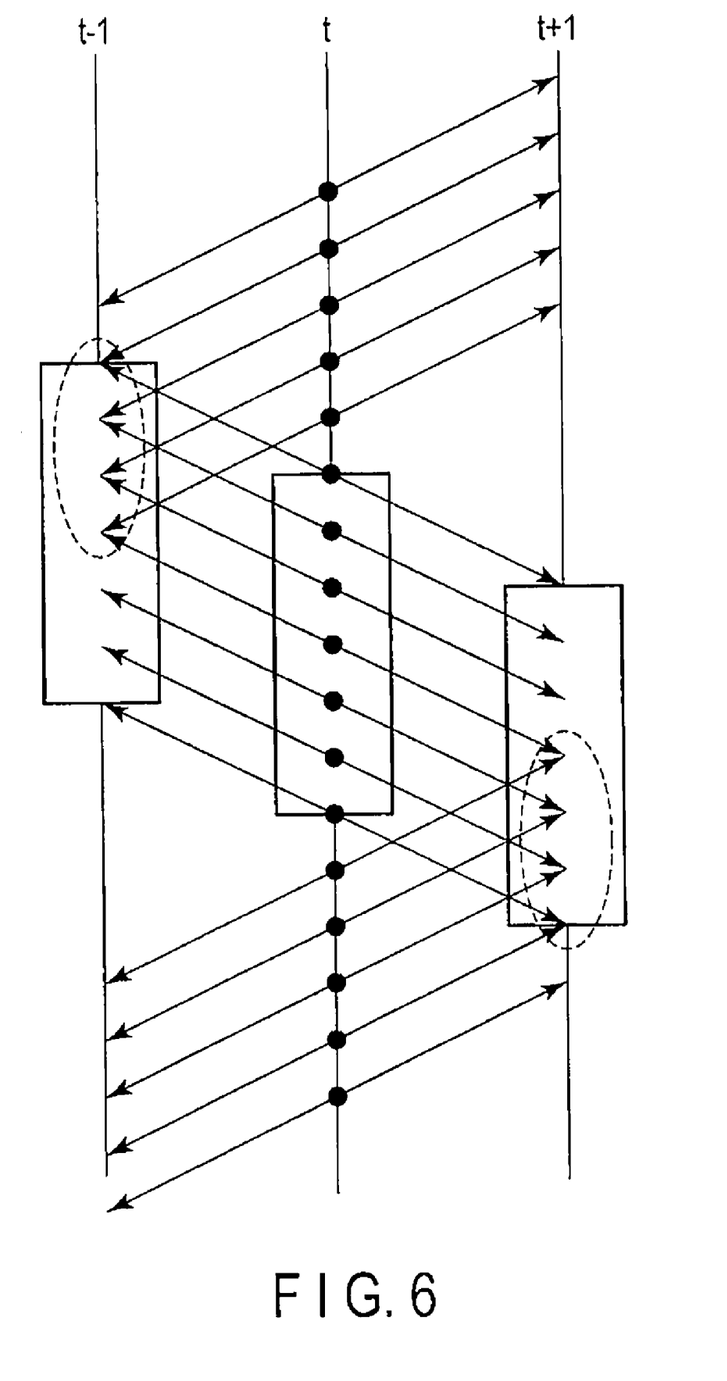
FIG. 6 is a diagram for illustrating a conflict of objects of the image.

FIG. 6 shows a sectional view of the condition in which an object moves on a background. The region surrounded by a dashed line is defined as a region "conflict" on which the motion vectors collide with each other. This conflict shows the overlap of the motion vectors. Conflicting two vectors defined by the following equation (5) are taken into consideration.

$$u(x_1, y_1)$$
$$u(x_2, y_2) \qquad (5)$$

Because a motion vector on the frontward side appears on a screen always, the difference value of the pixel comes to be smaller than the motion vector on the backward side.

Thus, the anteroposterior relation between two vectors conflicting can be determined by absolute pixel difference defined by the following equation.

$$\delta_1 = |I_{t-1}(x_1 + u_x(x_1, y_1), y_1 + u_y(x_1, y_1)) - I_t(x_1, y_1)|$$

$$\delta_2 = |I_{t-1}(x_2 + u_x(x_2, y_2), y_2 + u_y(x_2, y_2)) - I_t(x_2, y_2)| \qquad (6)$$

In other words, the anteroposterior relation between two vectors is expressed by the following equation.

In the case of $\delta_1 \leq \delta_2, u(x_1, y_1)$ is superior

In the case of $\delta_1 > \delta_2, u(x_2, y_2)$ is superior $\qquad (7)$

Because the clusters to which u(x1,y1) and u(x2,y2) belong can determine by labels l(x1,y1) and l(x2,y2), the anteroposterior relation between the clusters can be understood from a conflict of the motion vectors. This determination is done for the whole screen, and the most backward cluster is determined.

Figure 7:
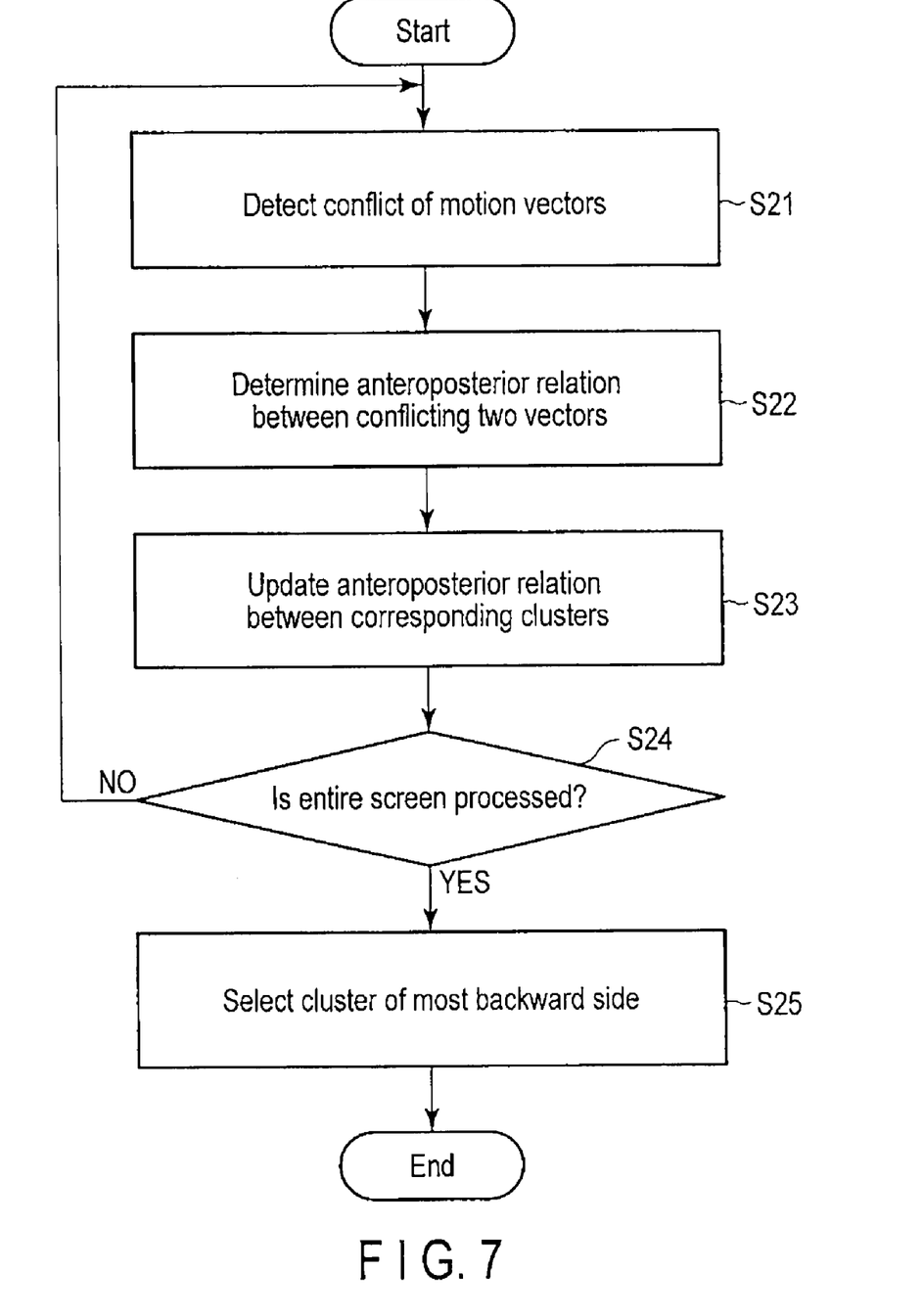
FIG. 7 is flowchart indicating a back vector detection method.

The action of the most backward vector detector 24 will be described referring to flowchart of FIG. 7.

At first, a conflict between motion vectors is detected (step S21). The anteroposterior relation between the detected conflicting vectors is determined (S22). The anteroposterior relation between corresponding clusters is updated (S23). It is determined whether the whole screen was processed (S24). When this determination is Yes, the cluster located on the most backward side is selected (S25), and then the process is finished. When the determination of step S24 is No, the process returns to step S21.

<Depth Calculation Step S14>

The mean motion vector of a cluster is assumed to be the most backward vector u_deep. In the depth calculation step S14, the depth calculator 25 calculates a depth value from the motion vector and the most backward vector. The depth value is calculated from the disparity vector by using mutual similarity of two triangles of a triangle obtained by connecting the right eye, the left eye and an object and a triangle defined by a right disparity, a left disparity and the object as shown in FIG. 5. Each parameter shown in FIG. 5 is assumed to be defined as follows.

Depth: z
Disparity vector: d [cm]
Eye separation distance: b [cm]
Distance to a screen: zs [cm]
Protruding distance: z0 [cm]
The maximum value of depth: zmax
Depth size in a real space: Lz [cm]

b, zs, z0 and Lz are set to given values here. The disparity is calculated from the motion vector and the most backward vector by the following equation (8).

$$d = \|u(x,y) - u_{deep}\| \qquad (8)$$

$\|\cdot\|$ is an operator for calculating a 12 norm (length) of a vector. However, a unit is a pixel, and conversion from a pixel size to [cm] is done according to the following equation (9).

$$d_{pixel} = \frac{\text{image resolution [pixel]}}{\text{screen size [cm]}} d_{cm} \qquad (9)$$

The depth value z is in the range of 0-255 (it may be 0-1), 0 is assumed to be frontward and 255 is assumed to be backward. However, this value is a virtual value absolutely, and it is necessary to be transformed into a real distance. The transform is done according to the following equation (10) using a depth size Lz in a real space.

Transformation from the depth to the real space:

$$\gamma = \frac{L_z}{z_{max}} \text{[cm]} \qquad (10)$$

zmax=255 s. Then, the distance from a screen to an object is calculated by the following equation (11).

$$z' = \gamma z - z_0 \qquad (11)$$

A disparity-depth conversion model is expressed from a mutual similarity of triangles by the following equation (12).

$$d : b = (z') : (z_s + z') \qquad (12)$$
$$d(z_s + z') = bz'$$
$$z = \frac{(b-d)z_0 + dz_s}{\gamma(b-d)}$$

Figure 8:
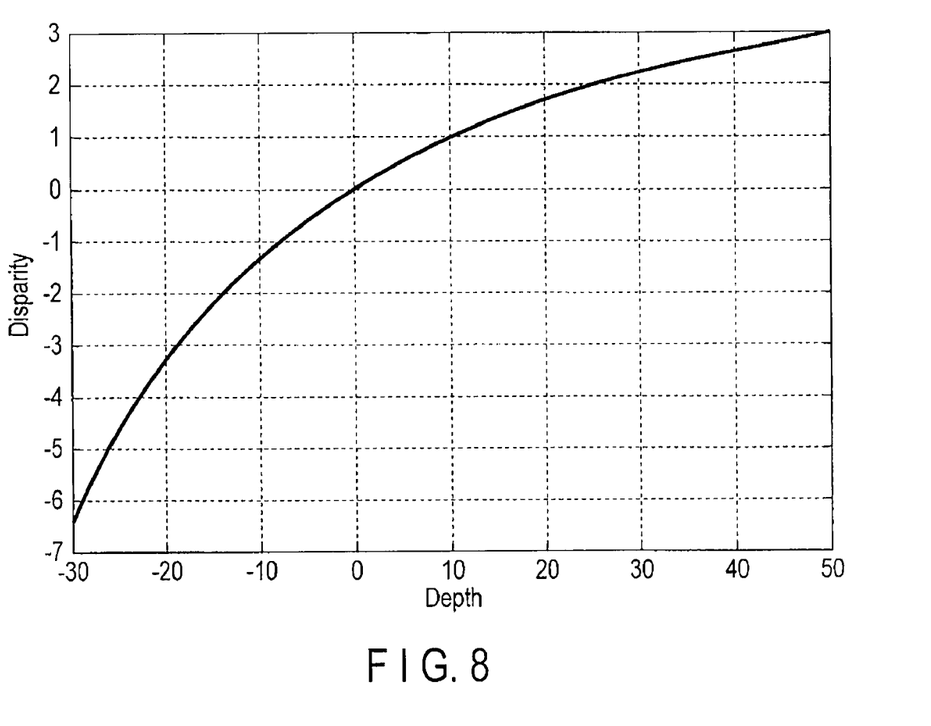
FIG. 8 is a diagram for illustrating a back conversion model.

The depth value is calculated for each pixel by the depth conversion model. FIG. 8 illustrates a curve obtained by plotting results calculated by the equation 12. The axis of ordinate of the graph of FIG. 8 shows a disparity, and the abscissa axis thereof shows a depth.

By the above depth conversion model, the motion vector increasing in the right direction represents to be more backward and the motion vector increasing in the left direction represents to be more frontward. This comes to be reversed when the axis is reversed.

The above depth conversion model is a model having a relation of inverse proportion with respect to the disparity vector, but the depth conversion model may be a model of a function approximating an inverse proportional relation by a partial proportional relation.

The distance zs to the screen is a value directly relating to a calculated depth value, and thus the distance zs to the screen may be determined so that the histogram of the calculated depth value is widened as much as possible.

<Disparity Vector Calculation Step S15>

If once the depth value is calculated, a disparity image can be created according to an arbitrary parameter. The disparity vector calculator 26 calculates from the depth value the disparity vector for creating a disparity image.

The parameters b, zs, z0 and Lz for the stereoscopic vision can be determined arbitrarily based on the stereoscopic vision to be presented. For example, zs is determined according to the position of a real screen, and when an amount of projection is increased, z0 is increased. In addition, the value of the depth can be determined by Lz.

If the parameters for the stereoscopic vision are determined, the disparity vector is calculated from the value of the depth according to a depth disparity vector conversion model of the following equation (13) obtained by transforming the conversion model of the expression (2).

$$d : b = (z') : (z_s + z')$$
$$d = b\left(\frac{z'}{z_s + z'}\right):$$
(13)

Where a unit is [cm]

Figure 9:
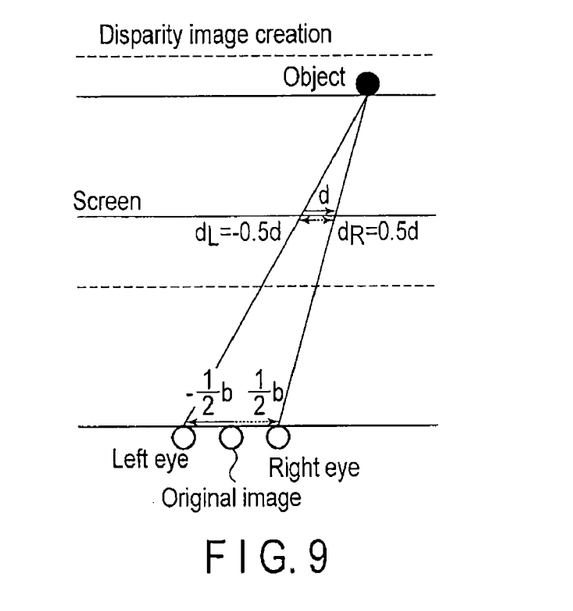
FIG. 9 is a diagram for illustrating a disparity image generation.

<Disparity Image Generation Step S16>

In the disparity image generation step S16, the disparity image creator 27 creates the disparity images by the number of disparity images to be created from t frames and the disparity vector.

Assuming that t frames of the image are obtained from an intermediate view point between the left eye and the right eye, the left disparity image and the right disparity image can be created from the disparity vectors $d_L, d_R$ obtained by multiplying the disparity vector d by $$-\frac{1}{2}, \frac{1}{2}$$

as shown in the following equation (14).

$$d_L = -\frac{1}{2}d$$
$$d_R = \frac{1}{2}d$$
(14)

In other words, the right and left disparity images can be created as $d_L = -0.5$ d, and $d_R = 0.5$ d.

The left disparity image can be created by moving the pixel value It(x,y) of the t frame according to $d_L$. The right disparity image is similar, too. When it is moved simply, a hole may be formed. The region of the hole may be embedded by an image obtained by interpolation using a peripheral disparity vector. The case of two disparities is described here, but the case of multiples disparities may be processed similarly.

The left disparity image and the right disparity image created as described above are displayed as a single image on a display by being switched alternately at high speed or by being switched in time or in space in a form of watching the first line of the image by the left eye and the second line by the right eye so that respective images are watched by the left eye and the right eye respectively.

According to the present invention as describe above, the images different in time are stored in a frame memory, and the motion vectors are detected from the images in the different times over the entire screen. These motion vectors are divided into groups each including vectors having the same direction. In other words, clustering is performed. By this clustering, a plurality of clusters are extracted from the screen. The cluster of these clusters on which the most number of clusters are superimposed is detected at sight of the superimposition of these clusters. A mean motion vector of the cluster superimposed by the most number of clusters is determined as the most backward vector. It is determined that the larger the differential vector obtained by subtracting the motion vector of each cluster from the most backward vector is, the more frontward the cluster is, whereas the smaller it is the more backward the cluster is. In this way, when the depth of each cluster, i.e., each object is determined, the right and left disparity images of each object are created.

According to the present invention, the disparity images by which the image not almost wobbled can be viewed stereoscopically can be created.

The technique of the present invention described in the embodiment of the invention may be executed by a computer, and may be distributed by storing as a program allowing the computer to execute in a recording medium such as a magnetic disk (flexible disk, hard disk etc.), an optical disk (CD-ROM, DVD etc.) or a semiconductor memory and so on.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing method for creating a disparity image for a three-dimensional display from a two-dimensional video image, comprising:
   detecting, based on a first image of the two-dimensional video image in an arbitrary time and a second image in another time different from the first image, motion vectors between the first image and the second image for each block of the first image;
   detecting a most backward vector obtained for a block to be most backward from the motion vectors;
   calculating differential vectors between each motion vector and the most backward vector and giving a depth on a close to the block of the first image corresponding to the motion vector having the larger differential vector; and
   creating one or more disparity images from the first image and the depth.

2. The image processing method according to claim 1, wherein the detecting the most backward vector includes:
   dividing the motion vectors into one or more clusters;
   calculating mean motion vectors of the clusters, and
   setting any one of mean motion vectors to the most backward vector.

3. The image processing method according to claim 2, wherein the detecting the most backward vector includes detecting overlap of the motion vectors between the clusters and setting the mean motion vector of a cluster most superimposed by at least one another cluster to the most backward vector.

4. The image processing method according to claim 3, wherein a relation between the size of the differential vector and the depth is inversely proportional.

5. The image processing method according to claim 3, wherein a relation between the size of the differential vector and the depth is proportional.

6. An image processing apparatus for creating a disparity image for three-dimensional display from a two-dimensional video image, comprising:
- a motion vector detector configured to detect, based on a first image of the two-dimensional video image in an arbitrary time and a second image in another time different from the first image, motion vectors between the first image and the second image for each block of the first image;
- a most backward vector detector configured to detect, from among the motion vectors, a most backward vector of a portion whose depth is on the back side;
- a disparity vector detector configured to calculate differential vectors between each motion vector and the most backward vector and configured to give a depth on a close to the block of the first image corresponding to the motion vector having the larger differential vector; and
- a disparity image creator configured to create one or more disparity images from the first image and the depth.

* * * * *